US008971576B2

(12) United States Patent
Nakazato

(10) Patent No.: US 8,971,576 B2
(45) Date of Patent: Mar. 3, 2015

(54) INFORMATION PROCESSING APPARATUS AND PROCESSING METHOD THEREOF

(75) Inventor: Yusuke Nakazato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/701,281

(22) PCT Filed: Jun. 9, 2011

(86) PCT No.: PCT/JP2011/063755
§ 371 (c)(1),
(2), (4) Date: Nov. 30, 2012

(87) PCT Pub. No.: WO2011/158886
PCT Pub. Date: Dec. 22, 2011

(65) Prior Publication Data
US 2013/0094706 A1    Apr. 18, 2013

(30) Foreign Application Priority Data
Jun. 18, 2010 (JP) .................. 2010-139947

(51) Int. Cl.
G06K 9/68 (2006.01)
G01B 11/24 (2006.01)
G01B 11/25 (2006.01)
G01S 17/42 (2006.01)
G06T 7/00 (2006.01)

(52) U.S. Cl.
CPC *G06K 9/68* (2013.01); *G01B 11/24* (2013.01); *G01B 11/25* (2013.01); *G01S 17/42* (2013.01); *G06T 7/0065* (2013.01)
USPC ........................................................ 382/103

(58) Field of Classification Search
None
See application file for complete search history.

(56) References Cited

U.S. PATENT DOCUMENTS 8,363,929 B2 * 1/2013 Kojima et al. ................ 382/154
2004/0104915 A1 * 6/2004 Mori et al. .................... 345/561
(Continued)

FOREIGN PATENT DOCUMENTS

| EP | 1574818 A2 | 9/2005 |
| WO | 2007/129047 A1 | 11/2007 |
| WO | 2008/033329 A2 | 3/2008 |

OTHER PUBLICATIONS

T. Kondo et al., "Robust ICP Registration Algorithm Extended by M-estimation", IEICE Technical Report, Pattern Recognition and Media Understanding (PRMU), vol. 100, No. 507, pp. 21-26 (2001).
(Continued)

*Primary Examiner* — Atiba O Fitzpatrick
*Assistant Examiner* — Thomas A James
(74) *Attorney, Agent, or Firm* — Fitzpatrick, Cella, Harper & Scinto

(57) ABSTRACT

An information processing apparatus acquires a plurality of geometric features and normals at the respective geometric features from a target object arranged at the first position. The information processing apparatus also acquires a plurality of normals corresponding to the respective geometric features of the target object from a shape model for the target object that is arranged at the second position different from the first position. The information processing apparatus calculates direction differences between the acquired normals for respective pairs of corresponding geometric features of the target object and shape model. The information processing apparatus determines whether or not occlusion occurs at each geometric feature by comparing the calculated direction differences with each other.

14 Claims, 9 Drawing Sheets

WHEN CORRESPONDENCE IS CORRECT,
d1 = d2, AND NO OCCLUSION HAS OCCURRED

(56) References Cited

U.S. PATENT DOCUMENTS

| | | | |
|---|---|---|---|
| 2005/0089214 A1* | 4/2005 | Rubbert et al. | 382/154 |
| 2005/0180623 A1* | 8/2005 | Mueller et al. | 382/154 |
| 2005/0201611 A1 | 9/2005 | Lloyd, Jr. et al. | |
| 2005/0265598 A1* | 12/2005 | Noguchi et al. | 382/167 |
| 2006/0028474 A1* | 2/2006 | Pfister et al. | 345/473 |
| 2007/0092850 A1* | 4/2007 | Kaza | 433/24 |
| 2008/0020340 A1* | 1/2008 | Matov et al. | 433/24 |
| 2008/0037865 A1* | 2/2008 | Vetter et al. | 382/168 |
| 2008/0075328 A1 | 3/2008 | Sciammarella | |
| 2008/0166676 A1* | 7/2008 | Chishti et al. | 433/24 |
| 2008/0292131 A1* | 11/2008 | Takemoto et al. | 382/100 |
| 2009/0080036 A1 | 3/2009 | Paterson et al. | |
| 2009/0123892 A1* | 5/2009 | Sogo et al. | 433/213 |
| 2009/0169096 A1* | 7/2009 | Cipolla et al. | 382/154 |
| 2010/0020082 A1* | 1/2010 | Kumakura et al. | 345/441 |
| 2010/0103169 A1* | 4/2010 | Zhang et al. | 345/420 |
| 2010/0145898 A1* | 6/2010 | Malfliet et al. | 706/47 |
| 2010/0177319 A1* | 7/2010 | Towers et al. | 356/511 |
| 2010/0231583 A1* | 9/2010 | Furukawa et al. | 345/419 |
| 2010/0259746 A1* | 10/2010 | Ohnishi et al. | 356/4.01 |
| 2010/0289878 A1* | 11/2010 | Sato et al. | 348/46 |
| 2011/0081072 A1* | 4/2011 | Kawasaki et al. | 382/154 |
| 2011/0102550 A1* | 5/2011 | Daniel et al. | 348/46 |
| 2011/0112804 A1* | 5/2011 | Chishti et al. | 703/1 |
| 2011/0137626 A1* | 6/2011 | Matov et al. | 703/2 |
| 2012/0044504 A1* | 2/2012 | Ohnishi et al. | 356/602 |
| 2012/0051584 A1* | 3/2012 | Bonner et al. | 382/100 |
| 2012/0101790 A1* | 4/2012 | Hsu et al. | 703/6 |
| 2012/0294534 A1* | 11/2012 | Watanabe et al. | 382/195 |
| 2013/0181983 A1* | 7/2013 | Kitamura et al. | 345/419 |
| 2013/0238096 A1* | 9/2013 | Kotlus, Brett | 623/17.16 |
| 2013/0265393 A1* | 10/2013 | Takemoto et al. | 348/46 |

OTHER PUBLICATIONS

P.J. Besl et al., "A Method for Registration of 3-D Shapes", IEEE Transactions on Pattern Analysis and Machine Intelligence, vol. 14, No. 2, pp. 239-256 (1992).

* cited by examiner

WHEN CORRESPONDENCE ERROR IS GENERATED DUE TO OCCLUSION, d1≠d2, AND OCCLUSION HAS OCCURRED

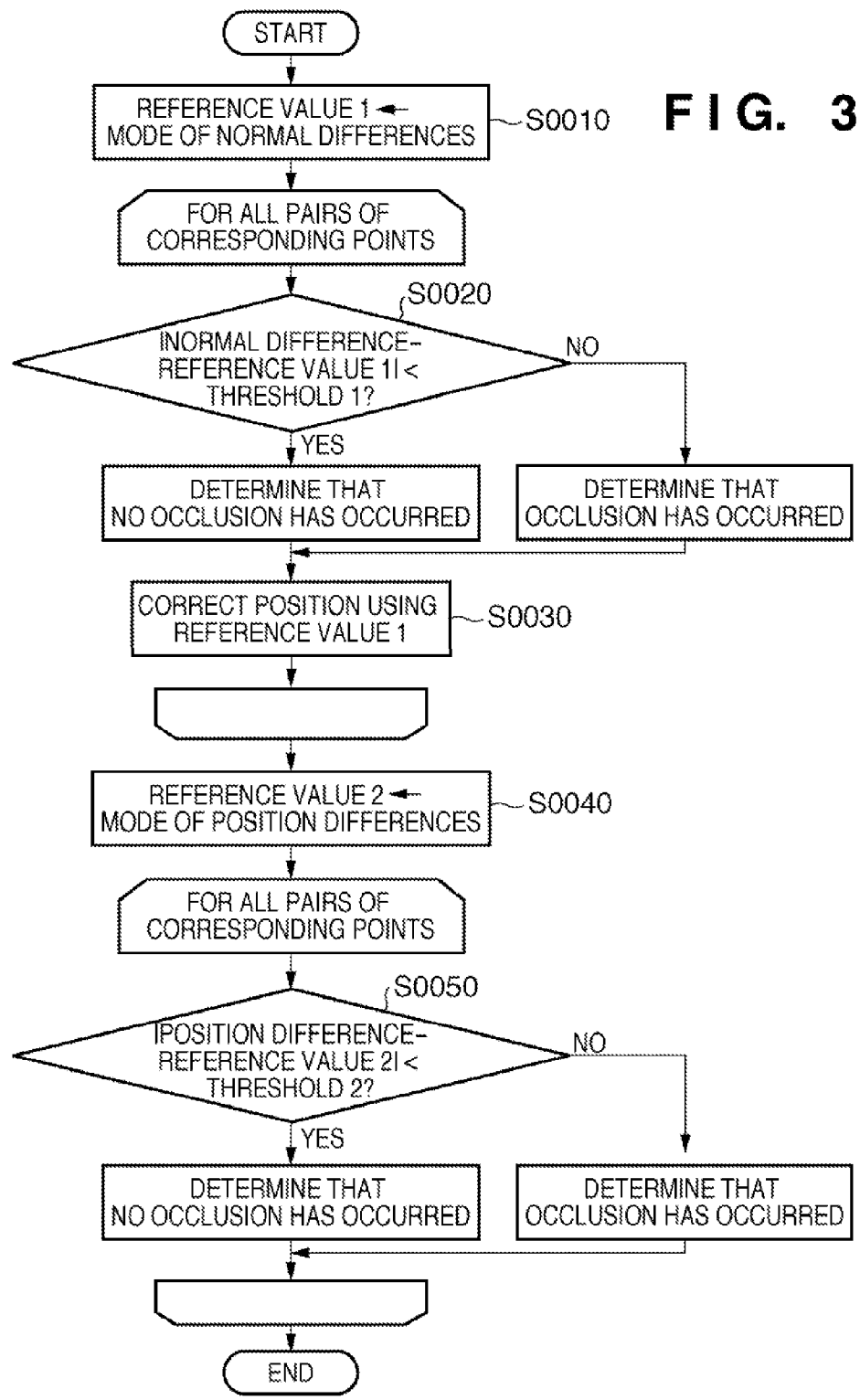

POSITION DIFFERENCE l1≠l2 EVEN
WHEN NO OCCLUSION HAS OCCURRED

WHEN CORRECTION BASED ON NORMAL
REFERENCE VALUE 1 IS NOT PERFORMED

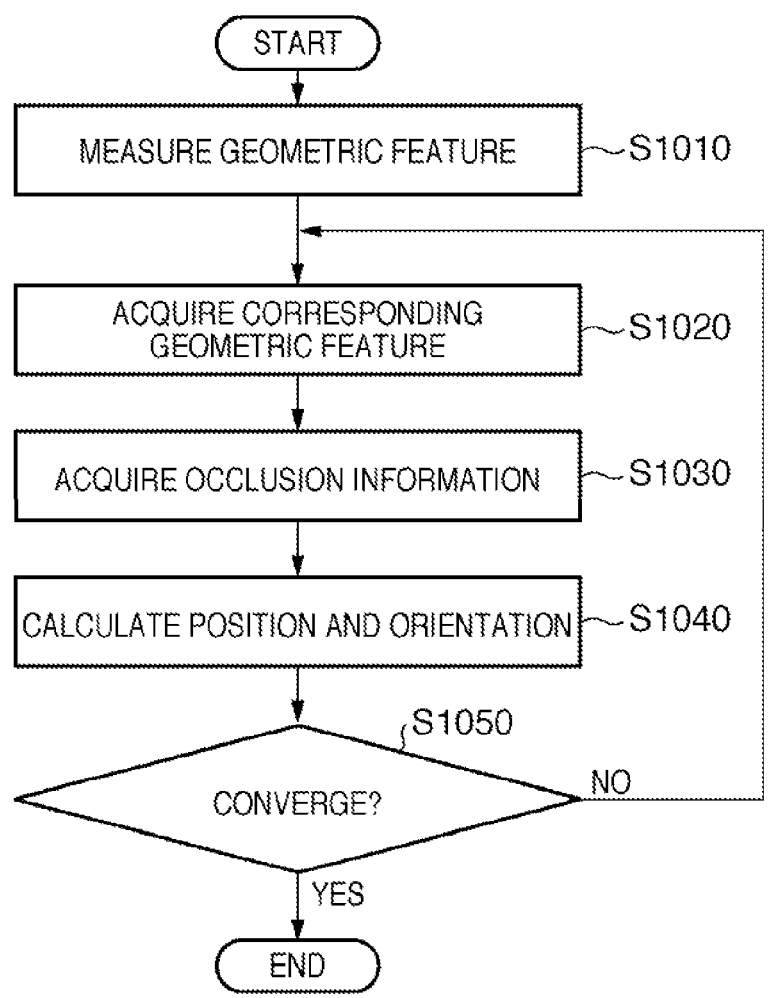

US 8,971,576 B2

INFORMATION PROCESSING APPARATUS AND PROCESSING METHOD THEREOF

TECHNICAL FIELD

The present invention relates to an information processing apparatus which performs occlusion determination in a three-dimensional measurement technique for objects, and a processing method in the information processing apparatus.

BACKGROUND ART

With the recent development of robot technology, robots are replacing humans to do complicated tasks such as assembly of industrial products. Assembling a product by a robot requires measuring the position, orientation, and three-dimensional shape of a target component.

For this purpose, there is proposed a method of reconstructing the three-dimensional shape of an object from a range image which holds a distance value for each pixel and is obtained by analyzing reflected light of light irradiating a target object. Also, a method of measuring the position and orientation of a target object using the three-dimensional shape model of an object is proposed. In these methods, correspondences between a plurality of range images or those between measurement points obtained from a range image and the surface of a shape model are searched. The distances between the correspondences are minimized to align measurement point groups and estimate the position and orientation of the target object.

In an environment where a target object and an object other than the target one coexist, a correspondence error readily occurs when searching for correspondences between measurement points and a shape model and those between measurement point groups. Even if the distance between erroneous corresponding points is minimized, no correct geometric relationship can be obtained, resulting in an alignment failure or unstable calculation.

To reduce the influence of the correspondence error, M-estimation is often used to apply a weight based on a statistical value pertaining to the distance between corresponding points, as described in "Robust ICP Registration Algorithm Extended by M-estimation" (Kondo, Miyamoto, Kaneko, Igarashi, IEICE Technical Report, Pattern Recognition and Media Understanding (PRMU), vol. 100, no. 507, pp. 21-26, 2001). This method assumes that a corresponding point apart from the average is less reliable. The weight is thus set large for a distance between correspondences close to the average and small for one apart from the average, thereby reducing the influence on alignment. This method is very effective for reducing the influence of noise such as an outlier.

However, when the distance between erroneous corresponding points due to occlusion is not so different from that between correct corresponding points, this method generates a correspondence error and cannot discriminate it from a correct correspondence. For example, a method disclosed in "A method for registration of 3-D shapes," (J. Besl and N. D. McKay, IEEE Transactions on Pattern Analysis and Machine Intelligence, vol. 14, no. 2, pp. 239-256, 1992) needs to search for a point of a shape model that is closest to a measurement point based on the approximate values of the position and orientation of a target object. At this time, if an occluding object occludes the target object, measurement points on the occluding object may be determined as those on the target object which are occluded and cannot be observed, and may be made to erroneously correspond to points of the shape model. Especially when the occluding object is a thin object or when noise or the deviation of the approximate position and orientation is large, the distance between erroneous corresponding points owing to occlusion becomes less different from that between correct corresponding points. In this case, it is difficult for M estimation to reduce the influence of the correspondence error caused by occlusion.

SUMMARY OF INVENTION

An aspect of the present invention is to eliminate the above-mentioned problems with the conventional technology. The present invention provides an information processing apparatus which improves the accuracy of correspondence between measurement points by decreasing a correspondence error between measurement points of a target object caused by generation of occlusion, which is hardly discriminated by the conventional technique, and a processing method thereof.

The present invention in its first aspect provides an information processing apparatus comprising: first acquisition means configured to acquire a plurality of geometric features and normals at the respective geometric features, from a target object arranged at a first position; second acquisition means configured to acquire a plurality of normals corresponding to the respective geometric features of the target object, from a shape model for the target object that is arranged at a second position different from the first position; calculation means configured to calculate direction differences between the normals acquired by the first acquisition means and the normals acquired by the second acquisition means, for respective pairs of corresponding geometric features of the target object and the shape model; and determination means configured to determine whether or not occlusion occurs at a geometric feature of the plurality of geometric features by comparing the direction differences calculated by the calculation means with each other.

The present invention in its second aspect provides an information processing apparatus comprising: first acquisition means configured to acquire a plurality of geometric features and normals at the respective geometric features, from a first target object when the first target object exists at a first position; second acquisition means configured to acquire a plurality of normals corresponding to the respective geometric features of the first target object, from a second target object which exists at a second position different from the first position and is identical in shape to the first target object; calculation means configured to calculate direction differences between the normals acquired by the first acquisition means and the normals acquired by the second acquisition means, for respective pairs of corresponding geometric features of the first target object at the first position and the second target object at the second position; and determination means configured to determine whether or not occlusion occurs at a geometric feature by comparing the direction differences calculated by the calculation means with each other.

The present invention in its third aspect provides a processing method in an information processing apparatus, comprising: a first acquisition step of acquiring a plurality of geometric features and normals at the respective geometric features, from a target object arranged at a first position; a second acquisition step of acquiring a plurality of normals corresponding to the respective geometric features of the target object, from a shape model for the target object that is arranged at a second position different from the first position; a calculation step of calculating direction differences between the normals acquired in the first acquisition step and the normals acquired in the second acquisition step, for respective pairs of corresponding geometric features of the target object and the shape model; and a determination step of determining whether or not occlusion occurs at a geometric feature by comparing the direction differences calculated in the calculation step with each other.

The present invention in its fourth aspect provides a processing method in an information processing apparatus, comprising: a first acquisition step of acquiring a plurality of geometric features and normals at the respective geometric features, from a first target object when the first target object exists at a first position; a second acquisition step of acquiring a plurality of normals corresponding to the respective geometric features of the first target object, from a second target object which exists at a second position different from the first position and is identical in shape to the first target object; a calculation step of calculating direction differences between the normals acquired in the first acquisition step and the normals acquired in the second acquisition step, for respective pairs of corresponding geometric features of the first target object at the first position and the second target object at the second position; and a determination step of determining whether or not occlusion occurs at a geometric feature by comparing the direction differences calculated in the calculation step with each other.

The present invention can improve the accuracy of correspondence between measurement points by decreasing a correspondence error between measurement points of a target object caused by generation of occlusion, which is hardly discriminated by the conventional technique.

Further features of the present invention will become apparent from the following description of exemplary embodiments with reference to the attached drawings.

BRIEF DESCRIPTION OF DRAWINGS

FIG. 3 is a flowchart showing an occlusion determination processing sequence;

FIG. 5 is a flowchart showing a processing sequence of estimating the position and orientation of a target object;

DESCRIPTION OF EMBODIMENTS

Figure 1A:
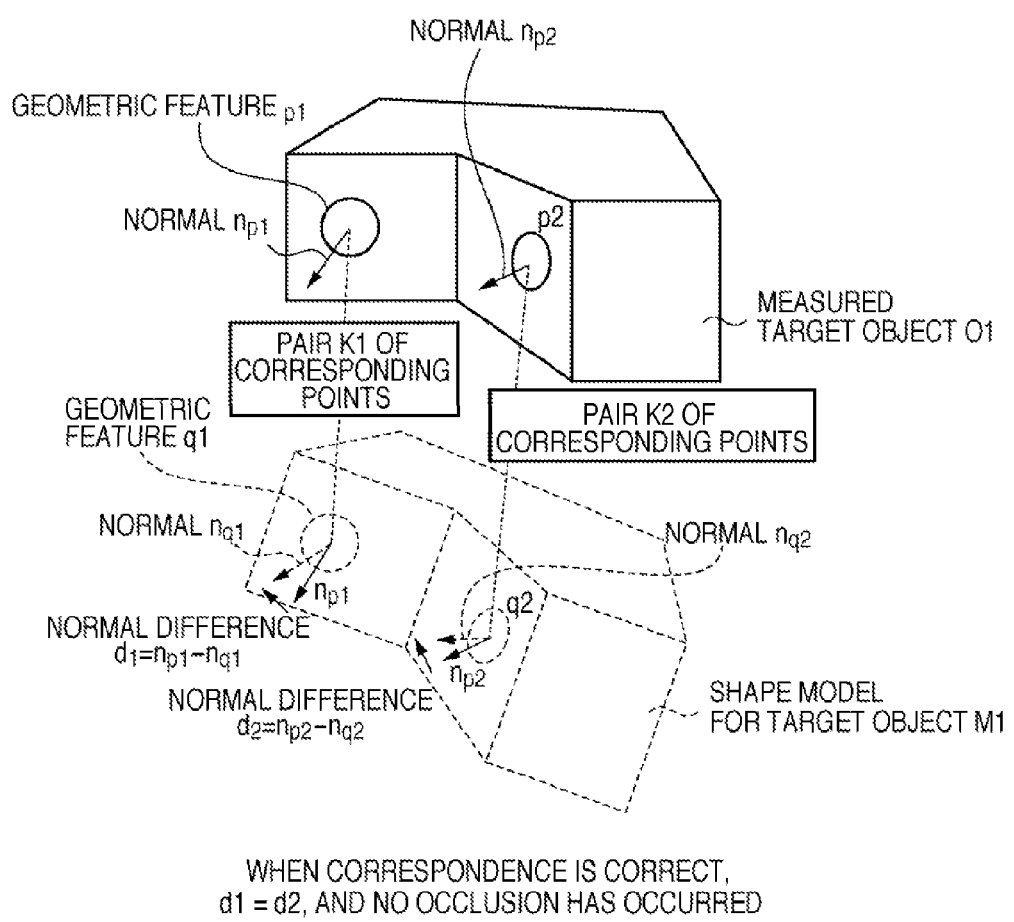
FIGS. 1A and 1B are views for explaining the principle of occlusion determination based on the normal difference.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same parts, and a repetitive description thereof will be omitted.

First Embodiment

The first embodiment will explain a case in which occlusion information is acquired when estimating the position and orientation of a target object by fitting a three-dimensional shape model for the target object to three-dimensional point groups obtained by measuring the target object. First, the principle of occlusion determination for a pair of corresponding points according to the embodiment will be described with reference to FIGS. 1A and 1B. FIG. 1A shows a target object O1 whose position and orientation are measured at the first position (first acquisition), and a target object shape model M1 whose position and orientation at the second position are set in advance (second acquisition). When no occlusion occurs, a normal difference $d_1$ of a pair K1 of corresponding points and a normal difference $d_2$ of a pair K2 of corresponding points indicate the orientation difference between the shape model M1 and the target object O1 and thus have the same value, as shown in FIG. 1A.

Figure 1B:
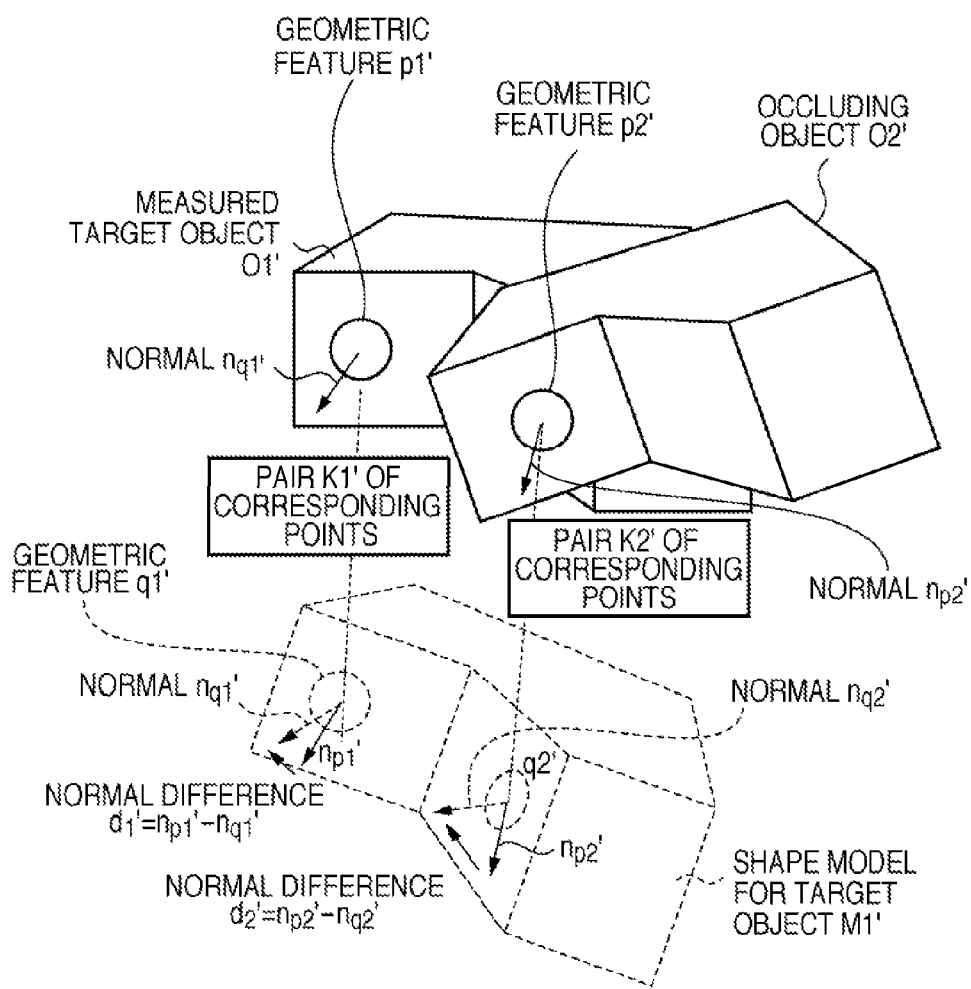

In contrast, when occlusion occurs, a normal difference $d_1'$ of a pair K1' of corresponding points and a normal difference $d_2'$ of a pair K2' of erroneous corresponding points owing to occlusion have different values, as shown in FIG. 1B. In FIG. 1B, a geometric feature q2' of a shape model M1' and measurement data p2' of an occluding object erroneously correspond to each other owing to occlusion. The orientation of the plane of the measurement data p2' differs from that of a target object O1' which should originally correspond to the geometric feature q2'. Thus, the normal differences $d_1'$ and $d_2'$ have different values.

From this, assuming that the occluded region is partial, the normal differences between pairs of corresponding points, that is, corresponding geometric features are compared with each other, and a highest-frequency difference value is calculated. If the correspondence error is partial, the highest-frequency difference value (mode) is approximate to the normal difference arising from the orientation difference between measurement data free from a correspondence error. If the normal difference between corresponding geometric features is close to the mode, it is determined that no occlusion has occurred.

Figure 2:
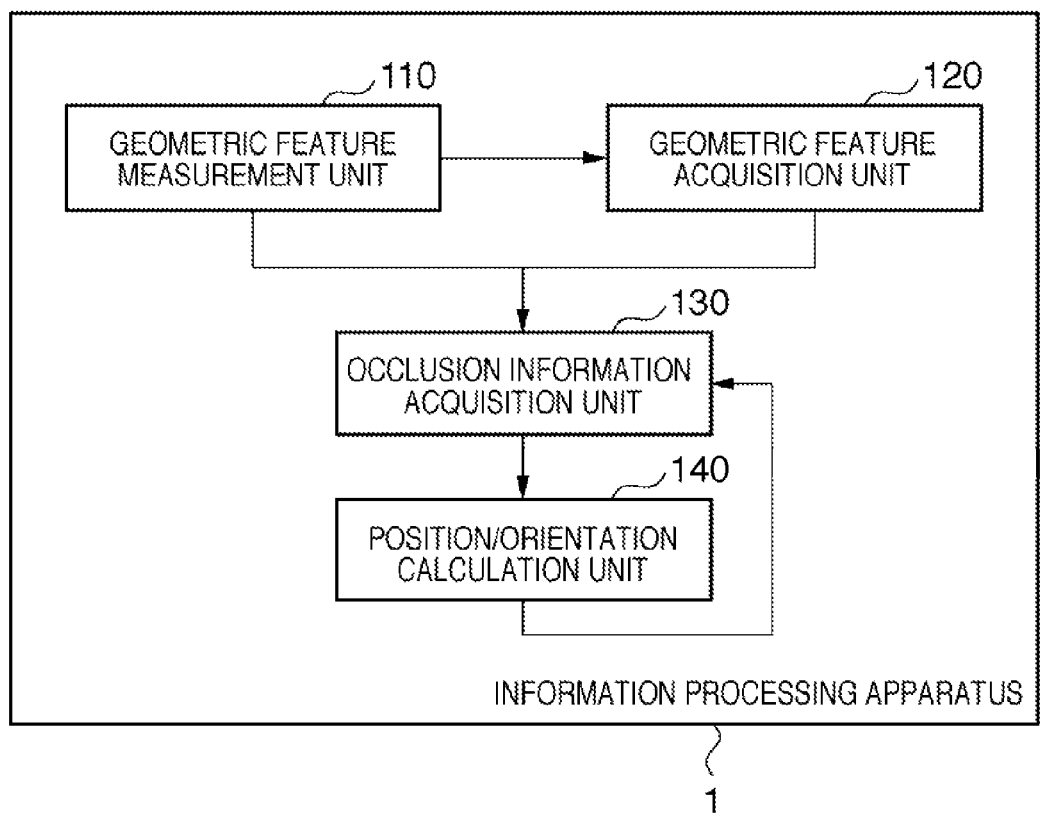
FIG. 2 is a block diagram showing the arrangement of an information processing apparatus 1.

FIG. 2 shows the arrangement of an information processing apparatus 1 in the first embodiment. As shown in FIG. 2, the information processing apparatus 1 includes a geometric feature measurement unit 110, geometric feature acquisition unit 120, occlusion information acquisition unit 130, and position/orientation calculation unit 140. The building units of the information processing apparatus 1 will be explained.

The geometric feature measurement unit 110 measures the positions of three-dimensional points and normal directions at these positions for a plurality of geometric features of a target object. A camera irradiates a target with a laser beam, slit light, or pattern light by an active method, captures three-dimensional points from the reflected light, and measures the distance by triangulation. However, the distance sensor is not limited to this method, and may adopt the time-of-flight method using the flight time of light or a passive method for a stereo camera or the like.

When information measurable by the distance sensor is only the position, the normal direction of measurement data is calculated using the positions of neighboring geometric features. The normal direction can be calculated by performing principal component analysis for the position of a geometric feature of interest and those of neighboring geometric features, and defining the third principal component as the normal direction. Alternatively, the normal direction may be calculated by performing plane fitting to the position of a geometric feature of interest and those of neighboring geometric features. However, the representation is not limited to the normal vector and may be two vectors perpendicular to the normal as long as they represent the orientation of a plane.

The geometric feature of a target object is not limited to a three-dimensional point, and suffices to have a position and plane orientation as attributes of the geometric feature. For example, the geometric feature may be feature point groups obtained from a moving image by Structure-from-Motion, or a plane obtained by plane fitting to measurement point groups. Further, the geometric feature of a target object that has been saved in a storage device may be acquired.

The geometric feature acquisition unit 120 acquires, from a shape model for a target object, plane positions and normal directions as geometric features corresponding to a plurality of geometric features acquired by the geometric feature measurement unit 110, and outputs a plurality of pairs of corresponding geometric features. The embodiment uses the plane as the geometric feature of the shape model. However, the geometric feature of the shape model is not limited to the plane. The geometric feature may be a three-dimensional point having the normal direction, or a geometric feature having information about the position and plane orientation.

Nearest neighbor search is used to search for a geometric feature of a shape model that corresponds to a geometric feature measured by the geometric feature measurement unit 110. The shape model is arranged at the approximate position and orientation of the target object. The distances in the three-dimensional space between geometric features measured by the geometric feature measurement unit 110 and geometric features of the shape model are calculated. Geometric features having a shortest distance between them are made to correspond to each other. However, the correspondence may be made in a reverse order, and a geometric feature measured by the geometric feature measurement unit 110 that is closest to a geometric feature of the shape model may be searched for. The correspondence method is not limited to nearest neighbor search. For example, a two-dimensional plane viewed from the sensor may be created using the focal length and the angle of view which are parameters of the camera model of the sensor used in the geometric feature measurement unit 110, and geometric features may be made to correspond to each other on a projection image. Also, geometric features acquired by the geometric feature measurement unit 110 and geometric features of a shape model arranged at the approximate position and orientation of the target object may be projected onto a two-dimensional plane, and geometric features closest to each other on the projection plane may be made to correspond to each other.

For a correspondence pair of a measurement point and a geometric feature of the shape model that is acquired by the geometric feature acquisition unit 120, the occlusion information acquisition unit 130 determines whether a correspondence error has occurred due to occlusion, and acquires the information. An occlusion information acquisition method will be explained with reference to an occlusion determination flowchart shown in FIG. 3. For example, the CPU of the information processing apparatus 1 executes each process shown in FIG. 3.

A case in which no occlusion has occurred and the correspondence is correct in steps S0010 and S0020 will be explained. As shown in FIG. 1A, the normal difference between corresponding geometric features indicates the relative orientations of measurement data and the shape model, and all normal differences ideally have the same value. From this, assume that the occlusion region is partial, at least half or more of correspondence pairs are correct, and the mode of the normal differences between corresponding points is approximate to a normal difference for a correct correspondence. The occlusion information acquisition unit 130 calculates the mode of the normal differences between corresponding points using all pairs of corresponding points, and determines that no occlusion has occurred for corresponding points having a normal difference between paired corresponding points that falls within the range of the first threshold from the normal reference value.

The normal difference can be obtained by, for example, the following method. The normal difference is given by a vector represented by the rotation axis and rotation angle. The outer product of the normals to corresponding geometric features is calculated and defined as the rotation axis v, as represented by equation (1), and the arc cosine of the normal is defined as the rotation angle $\underline{a}$, as represented by equation (2):

$$v = n_p \times n_q \quad (1)$$

$$a = a\cos(n_p, n_q) \quad (2)$$

where $n_p$ and $n_q$ are the normal vector of a geometric feature of a shape model and the normal vector of a measurement point, respectively.

As for the mode of the normal difference, a vector represented by the rotation axis and rotation angle is converted into an Eulerian angle representation. The respective components are aligned independently, and Eulerian angles having the modes as components are converted again into a rotation angle representation about the rotation axis.

However, the calculation methods of the normal difference and its mode are not limited to them, and the normal vector difference and its mode may be employed. Further, the normal reference value is not limited to the mode of all the normal differences between corresponding points, and suffices to be a value equivalent to the relative orientations of measurement data and the shape model. For example, the mode of normal differences may be calculated not from all correspondence pairs but from correspondence pairs extracted at random. The average may be calculated using only normal differences between corresponding points that fall within a predetermined range, and used as the normal reference value. It is also possible to create a histogram of normal differences and use a peak as the normal reference value.

Step S0030 will be explained. When the plane orientation of an occluding object and that of a target object are accidentally almost the same, occlusion cannot be determined from only the normal difference. Since the orientations of measurement data and the shape model slightly differ from each other, it is difficult to determine whether occlusion has occurred even if the distances between corresponding points are simply compared. Hence, the orientation difference is corrected using the normal reference value to separate the small position and orientation differences of the shape model, acquiring occlusion information.

Figure 4A:
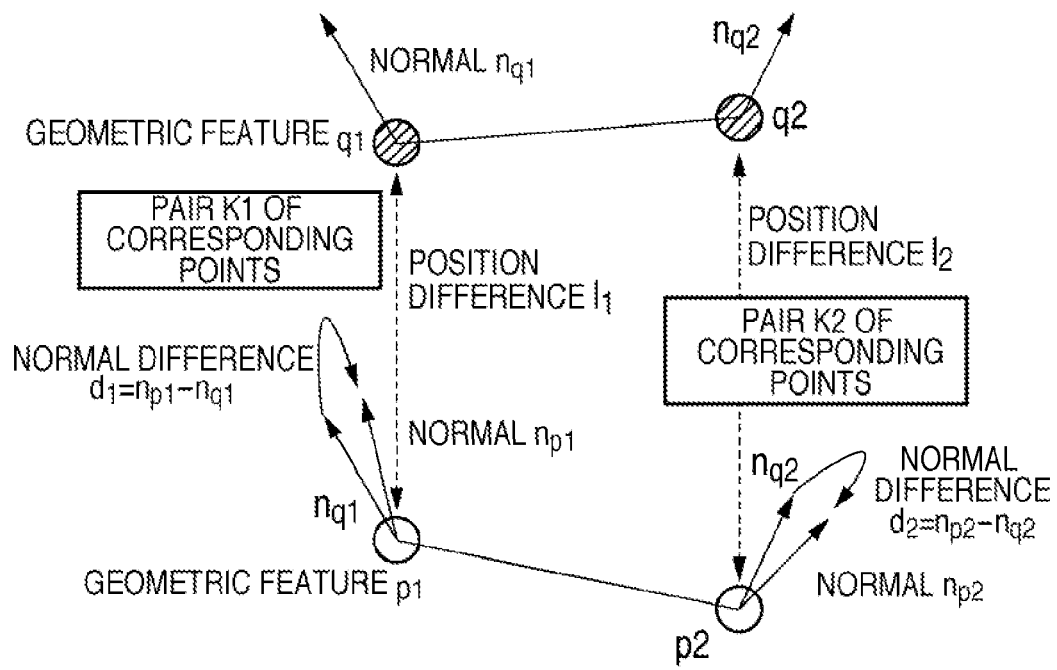
FIGS. 4A and 4B are views for explaining the principle of occlusion determination based on the position difference.
Figure 4B:
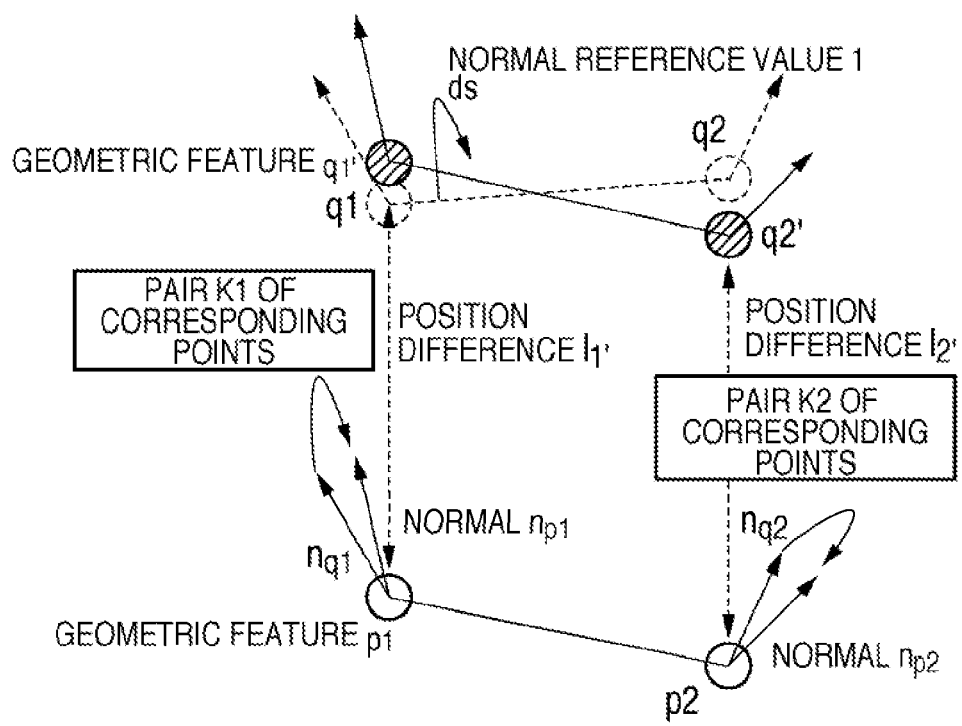

FIGS. 4A and 4B are views for explaining occlusion determination based on the position difference. As shown in FIG. 4A, even when no occlusion has occurred, the position difference changes depending on the orientation. Thus, the presence/absence of occlusion cannot be determined by only comparing position differences $l_1$ and $l_2$ between corresponding points. Considering this, the normal reference value is regarded as a relative orientation ds, and the difference between a position (q1', q2') obtained by rotating the position (q1, q2) of the geometric feature of either the shape model or measurement data, and the other position (p1, p2) is defined as the position difference ($l_1'$, $l_2'$), as shown in FIG. 4B. Note that the difference of the depth value using, as the reference, a geometric feature which has not been corrected because the rotation center of the relative orientation generated from the normal reference value is not known is adopted as the position difference.

More specifically, the position of the geometric feature of the shape model is corrected using a normal difference that is converted into a rotation angle representation about the rotation axis. Either the position of a measurement point or that of the geometric feature of the shape model is rotated using the rotation axis v and rotation angle $\underline{a}$ of the mode (normal reference value) of the normal difference. The distance or depth value of the rotated position in the three-dimensional space is compared with that of the other position, and the difference is defined as the position difference.

A point u' obtained by rotating an arbitrary point u at the rotation angle $\underline{a}$ about the rotation axis v can be calculated according to equation (3):

$$u' = \sin(a) u \times v + \cos(a) u + (1 - \cos(a))(u \cdot v) v \qquad (3)$$

However, the calculation method is not limited to the above one as long as the orientation difference between the shape model and measurement data can be canceled using the normal reference value. For example, the normal reference value may be converted into a quaternion or rotation matrix to convert the position of a geometric feature.

Operations in steps S0040 and S0050 of FIG. 3 will be explained. Similar to the occlusion determination based on the normal difference in steps S0010 and S0020, the mode of position differences is set as reference value 2, and it is determined that no occlusion has occurred for corresponding points, the position difference between which falls within the range of reference value 2 to predetermined threshold 2. However, reference value 2 of the position difference is not limited to the mode of position differences, and may be the average of position differences or a peak of the histogram of position differences.

Occlusion information is not limited to the presence/absence of occlusion. As occlusion information based on the normal difference, the likelihood of occlusion may be output as successive values corresponding to differences between normal differences between corresponding points and the normal reference value. Similarly, as occlusion information based on the position difference, the likelihood of occlusion may be output as successive values corresponding to differences between position differences and reference value 2.

In this case, a value indicating the likelihood of occlusion may be employed as a weight in alignment. For example, the index of the likelihood may be calculated in accordance with equations such as equations (4) to (6):

$$r_i = |g_i - c_i|/s_i \qquad (4)$$

$$r_i = f(|g_i - c_i|) \qquad (5)$$

$$\text{for } x \leq t, f(x) = (1 - (x/t)^2)^2$$

$$\text{for } x > t, 0 \qquad (6)$$

where i is a sign for uniquely identifying the normal or position, $r_i$ is the index of likelihood, $g_i$ is the vector of the normal or position difference, $c_i$ is the reference value of the normal or position difference, $s_i$ is the standard deviation of the normal difference or position difference, and f is the weight function. The weight function f is arbitrary, such as the Tukey function or the Huber function shown in equation (6), as long as it gives a small weight to data having a large error x and a large weight to data having a small error x, where t is a constant.

In the first embodiment, the product of occlusion information based on the normal difference in step S0020 and occlusion information based on the position difference in step S0050 serves as an output from the occlusion information acquisition unit 130. However, the occlusion information may be either occlusion information based on the normal difference or occlusion information based on the position difference, or a combination of them such as the sum of them.

The position/orientation calculation unit 140 in FIG. 2 estimates the position and orientation of the target object using a plurality of pairs of geometric features of the shape model and geometric features measured by the geometric feature measurement unit 110 for which the occlusion information acquisition unit 130 has determined that no occlusion has occurred. The position and orientation are calculated by minimizing an evaluation function based on the distances in the three-dimensional space between geometric features of the shape model and geometric features measured by the geometric feature measurement unit 110. In other words, the method is arbitrary as long as the position and orientation of a target object are estimated using an evaluation function based on the differences between geometric features of the shape model and geometric features measured by the geometric feature measurement unit 110. When the occlusion information acquisition unit 130 calculates a numerical value indicating the likelihood of occlusion for each pair of geometric features, the product of the evaluation function multiplied by the numerical value as a weight may be minimized.

FIG. 5 is a flowchart showing a position/orientation measurement processing sequence in the first embodiment. In this processing, the position and orientation are calculated by repetitively correcting the approximate values of the position and orientation of a target object to be measured by iterative operation. For example, the CPU of the information processing apparatus 1 executes each process shown in FIG. 5.

In step S1010, the geometric feature measurement unit 110 measures measurement data of a geometric feature of a target object. In step S1020, the geometric feature acquisition unit 120 acquires a geometric feature of a shape model that corresponds to the geometric feature measured in step S1010, and outputs a pair of corresponding geometric features.

In step S1030, the occlusion information acquisition unit 130 acquires occlusion information of the pair of the geometric features of the measurement data and shape model that has been acquired in step S1020. In the first embodiment, the presence/absence of occlusion is determined as occlusion information for each pair of corresponding geometric features. However, when occlusion information is used as a weight in step S1040, a numerical value indicating the likelihood of occlusion may be calculated.

In step S1040, the position/orientation calculation unit 140 updates the position and orientation of the target object by a nonlinear optimization method using a pair of geometric features for which it has been determined in step S1030 that no occlusion has occurred. In this processing, the distance in the three-dimensional space between three-dimensional points serving as a geometric feature of the shape model and a corresponding measured geometric feature is minimized by the Gauss-Newton method. The position and orientation are calculated by repetitively correcting the approximate values of the position and orientation of the target object by iterative operation until it is determined in step S1050 that the position and orientation converge. Note that the method of calculating the position and orientation of a target object to be measured is not limited to this. The calculation method may be an optimization method such as the Levenberg-Marquardt method or steepest descent method. Another nonlinear optimization calculation method such as the conjugate gradient method is also possible.

In step S1050, the position/orientation calculation unit 140 executes convergence determination. If the position and orientation converge, the process ends; if NO, the position and orientation of the target object are set as an approximate position and orientation, and the process returns to step S1020. The position and orientation are determined to converge when the difference between the sums of squares of error vectors before and after updating the position and orientation is almost zero. However, the determination condition is not limited to this. For example, the position and orientation are determined to converge when the update amounts of the position and orientation are almost zero.

Second Embodiment

In the first embodiment, measurement data of a target object and a shape model are aligned using the occlusion information acquisition method to estimate the position and orientation of the target object. In the second embodiment, a plurality of three-dimensional points obtained by measuring the first target object at the first position are moved to the second target object having the same shape at the second position, and aligned with a plurality of corresponding three-dimensional points. In this alignment, correspondence based on occlusion determination is applied. This method will be explained below.

Figure 6:
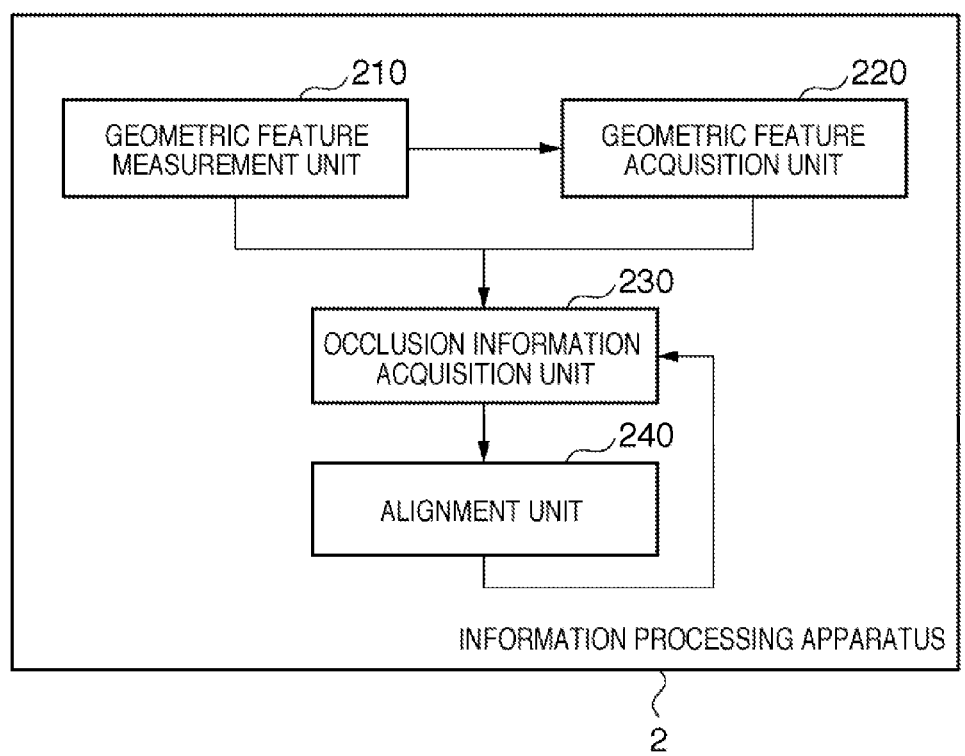
FIG. 6 is a block diagram showing the arrangement of an information processing apparatus.

FIG. 6 shows the arrangement of an information processing apparatus 2 in the second embodiment. As shown in FIG. 6, the information processing apparatus 2 includes a geometric feature measurement unit 210, geometric feature acquisition unit 220, occlusion information acquisition unit 230, and alignment unit 240. The building units of the information processing apparatus 2 will be explained.

Similar to the geometric feature measurement unit 110 in the first embodiment, the geometric feature measurement unit 210 measures the positions and normal directions (plane orientations) of geometric features of a target object. In the second embodiment, the position and normal direction of a three-dimensional point are measured, but the geometric feature is arbitrary as long as it has the position and plane orientation as attributes. Also, the position and normal direction of the geometric feature of a target object that have been saved in a storage device may be acquired. In the following description, geometric features measured by the geometric feature measurement unit 210 will be referred to as measurement data 1.

Similar to the geometric feature measurement unit 110 in the first embodiment, the geometric feature acquisition unit 220 measures the positions and normal directions (plane orientations) of geometric features of the target object, and outputs pairs of geometric features corresponding to measurement data 1. In the second embodiment, the position and normal direction of a three-dimensional point are measured, but the geometric feature is arbitrary as long as it has a position and plane orientation as attributes. Although the position and normal direction of the geometric feature of the target object which have been saved in a storage device may be acquired, geometric features different from measurement data 1 are acquired. In the following description, geometric features acquired by the geometric feature acquisition unit 220 will be referred to as measurement data 2. After acquiring geometric features, the geometric feature acquisition unit 220 searches for correspondence between measurement data 1 and measurement data 2, and outputs a pair of corresponding points, similar to correspondence search executed by the geometric feature acquisition unit 120 in the first embodiment.

Similar to the occlusion information acquisition unit 130 in the first embodiment, the occlusion information acquisition unit 230 acquires occlusion information between corresponding geometric features. The difference from the occlusion information acquisition unit 130 is that the determination target is not a pair of geometric features of measurement data and a shape model, but a pair of geometric features of measurement data 1 and measurement data 2. However, the processing method is the same.

The alignment unit 240 aligns measurement data 1 and measurement data 2 using pairs of geometric features for which the occlusion information acquisition unit 230 has determined that no occlusion has occurred. The alignment is done by minimizing an evaluation function based on the distances in the three-dimensional space between paired geometric features. This method is arbitrary as long as the position and orientation of a target object are estimated using an evaluation function based on the differences between measurement data 1 and measurement data 2. When the occlusion information acquisition unit 230 calculates a numerical value indicating the likelihood of occlusion for each pair of geometric features, the product of the evaluation function multiplied by the numerical value as a weight may be minimized.

Figure 7:
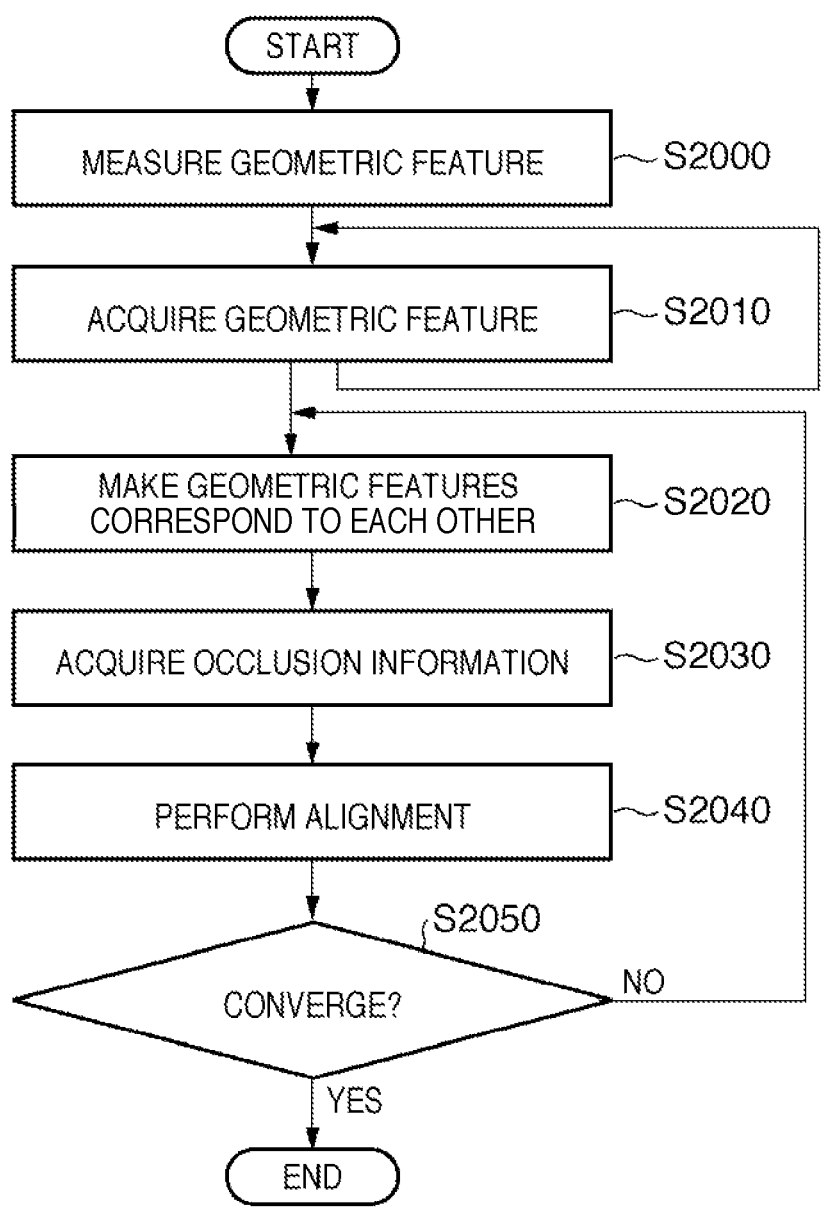
FIG. 7 is a flowchart showing a processing sequence of aligning measurement data of a target object.

FIG. 7 is a flowchart showing an alignment processing sequence for a plurality of three-dimensional points in the second embodiment. For example, the CPU of the information processing apparatus 2 executes each process shown in FIG. 7. In this processing, one of measurement data 1 and measurement data 2 is used as reference data, the relative position and orientation of the other measurement data with respect to the reference data are calculated by repetitively correcting them by iterative operation, and the measurement data are aligned with each other. Three-dimensional points obtained by integrating the aligned measurement data into one coordinate system serve as points representing the three-dimensional shape of the target object.

In steps S2000 and S2010, the geometric feature measurement unit 210 and geometric feature acquisition unit 220 measure and acquire measurement data of geometric features of the target object, respectively. The measurement data include the positions of geometric features (three-dimensional points) of the measured target object, normal directions at these positions, and an approximate position and orientation at the measurement viewpoint. In the second embodiment, a value measured using the GPS and inertial sensor is given as the approximate position and orientation at the measurement viewpoint. However, the approximate position and orientation suffice to provide the approximate relative positions and orientations of measurement data, and may be measured using any sensor as long as they can be obtained. An approximate position and orientation may be given manually, or calculated by manually giving the correspondence between measurement data.

In step S2020, the geometric feature acquisition unit 220 makes the geometric features of the measurement data that have been measured in steps S2000 and S2010 to correspond to each other. The second embodiment adopts nearest neighbor search to make a geometric feature of one measurement data correspond to the nearest geometric feature of the other measurement data based on the approximate position and orientation. However, the correspondence search method is not limited to this, and may be a method of making geometric features correspond to each other by projecting them onto an image according to a conventional technique.

In step S2030, the occlusion information acquisition unit 230 acquires occlusion information of the pair of the geometric features of the measurement data that have been made to correspond to each other in step S2020. In the second embodiment, the presence/absence of occlusion is determined as occlusion information for each pair of corresponding geometric features. However, when occlusion information is used as a weight in step S2040, a numerical value indicating the likelihood of occlusion may be calculated.

In step S2040, the alignment unit 240 updates the measured position and orientation obtained when the measurement data was measured by a nonlinear optimization method using a pair of geometric features. In this processing, the distance in the three-dimensional space between paired corresponding measurement points is minimized by the Gauss-Newton method. The measured position and orientation of each measurement data are repetitively corrected by iterative operation until it is determined in step S2050 that the measured position and orientation converge. Note that the measured position/orientation calculation method is not limited to this. The calculation method may be a conventional optimization method such as the Levenberg-Marquardt method or steepest descent method, or another nonlinear optimization calculation method such as the conjugate gradient method.

In step S2050, the alignment unit 240 executes convergence determination. If the position and orientation converge, the process ends; if NO, the measured position and orientation are updated, and the process returns to step S2020. The measured position and orientation are determined to converge when the difference between the sums of squares of error vectors before and after updating the measured position and orientation is almost zero. However, the determination condition is not limited to this. For example, the measured position and orientation are determined to converge when the update amounts of the measured position and orientation are almost zero. After convergence, measurement data are integrated into one coordinate system based on the estimated measured position and orientation, and the integrated data is output as a set of geometric features representing a three-dimensional shape.

In the second embodiment, two three-dimensional point groups are aligned with each other. However, the number of measurement data groups is not limited to two, and may be three or more. When a plurality of measurement data groups are handled, the second embodiment is applied to two arbitrary measurement data groups.

As described above, the first and second embodiments can be applied to measurement of the three-dimensional shape of an object, object recognition, estimation of the self-position of a robot, and estimation of the relative positions and orientations of a robot and object.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-139947, filed Jun. 18, 2010, which is hereby incorporated by reference herein in its entirety.

The invention claimed is:

1. An information processing apparatus comprising:
a first acquisition unit configured to acquire a plurality of parts and normals at the respective parts, from a target object arranged at a first position, wherein each of the plurality of parts include a geometric feature;
a second acquisition unit configured to acquire normals corresponding to the respective parts of the target object from a shape model for the target object that is arranged at a second position different from the first position; and
a determination unit configured to determine whether the target object is occluded by another object which is different from the target object based on the normals acquired by said first acquisition unit and the normals acquired by said second acquisition unit.

2. The apparatus according to claim 1, further comprising a calculation unit configured to calculate direction differences between the normals acquired by said first acquisition unit and the normals acquired by said second acquisition unit, for each pair of corresponding parts of the target object and the shape model.

3. The apparatus according to claim 2, wherein said determination unit creates a histogram of the calculated direction differences, sets a peak of the histogram as a normal reference value, and
for a part at which a difference between a calculated direction difference and the normal reference value is smaller than a first threshold, said determination unit determines that the target object is not occluded by another object.

4. The apparatus according to claim 2, further comprising a position/orientation calculation unit configured to calculate a position and orientation of the target object by fitting the shape model to minimize a distance between parts of each pair for which said determination unit determines that the target object is not occluded by another object.

5. The apparatus according to claim 4, wherein said determination unit determines whether the target object is occluded by another object the respective parts based on a distance between paired parts.

6. An information processing apparatus comprising:
a first acquisition unit configured to acquire a plurality of parts and normals at the respective parts, from a first target object when the first target object exists at a first position, wherein each of the plurality of parts includes geometric feature;
a second acquisition unit configured to acquire normals corresponding to the respective parts of the first target object, from a second target object which exists at a second position different from the first position and is identical in shape to the first target object; and
a determination unit configured to determine whether the first target object is occluded by the second target object based on the normals acquired by said first acquisition unit and the normals acquired by said second acquisition unit.

7. The apparatus according to claim 6, further comprising an alignment unit configured to align the second target object to the first position by moving the second target object to minimize a distance between parts of each pair for which said determination unit determines that the first target object is not occluded by the second target object.

8. A processing method in an information processing apparatus, comprising:

a first acquisition step of acquiring a plurality of parts and normals at the respective parts, from a target object arranged at a first position, wherein each of the plurality of parts include a geometric feature;

a second acquisition step of acquiring normals corresponding to the respective parts of the target object from a shape model for the target object that is arranged at a second position different from the first position;

and a determination step of determining whether the target object is occluded by another object which is different from the target object based on by comparing the direction differences calculated in the calculation step with each other normals acquired by said first acquisition unit and the normals acquired by said second acquisition unit;

a determination unit configured to determine whether the target object is occluded by another object which is different from the target object based on normals acquired in said first acquisition step and the normals acquired in said second acquisition step.

9. A processing method in an information processing apparatus, comprising:

a first acquisition step of acquiring a plurality of parts and normals at the respective parts, from a first target object when the first target object exists at a first position, wherein each of the plurality of parts includes geometric feature;

a second acquisition step of acquiring normals corresponding to the respective parts of the first target object, from a second target object which exists at a second position different from the first position and is identical in shape to the first target object;

and a determination step of determining whether the first target object is occluded by the second target object based on the normals acquired in said first acquisition step and the normals acquired in said second acquisition step.

10. A non-transitory computer readable medium storing a program for causing a computer to execute each step of a processing method in an information processing apparatus defined in claim 8.

11. A non-transitory computer readable medium storing a program for causing a computer to execute each step of a processing method in an information processing apparatus defined in claim 9.

12. The apparatus according to claim 6, further comprising a calculation unit configured to calculate direction differences between the normals acquired by said first acquisition means and the normals acquired by said second acquisition means, for each pair of corresponding parts of the first target object at the first position and the second target object at the second position.

13. The apparatus according to claim 1, wherein each of the plurality of parts is a plane constituting the target object.

14. The apparatus according to claim 6, wherein each of the plurality of parts is a plane constituting the first target object.

* * * * *